United States Patent
Trojahn et al.

(10) Patent No.: US 8,499,458 B2
(45) Date of Patent: Aug. 6, 2013

(54) METHOD FOR PRODUCING A ROLLING BEARING COMPONENT AND ROLLING BEARING COMPONENT

(75) Inventors: Werner Trojahn, Niederwerrn (DE); Silke Roesch, Niederwerrn (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 925 days.

(21) Appl. No.: 12/301,277

(22) PCT Filed: May 10, 2007

(86) PCT No.: PCT/DE2007/000854
§ 371 (c)(1),
(2), (4) Date: Dec. 10, 2008

(87) PCT Pub. No.: WO2007/134571
PCT Pub. Date: Nov. 29, 2007

(65) Prior Publication Data
US 2009/0310898 A1 Dec. 17, 2009

(30) Foreign Application Priority Data
May 19, 2006 (DE) .......................... 10 2006 023 690

(51) Int. Cl.
*B23P 17/00* (2006.01)
(52) U.S. Cl.
USPC ................. 29/898.12; 29/898.13; 29/898.14
(58) Field of Classification Search
USPC ............ 29/898.12–898.14; 384/569; 427/287
See application file for complete search history.

(56) References Cited

U.S. PATENT DOCUMENTS

| | | | |
|---|---|---|---|
| 6,485,681 B1 * | 11/2002 | Commandeur et al. | 420/537 |
| 6,569,546 B1 * | 5/2003 | Sato et al. | 428/697 |
| 2002/0064667 A1 * | 5/2002 | Scheckenbach et al. | 428/457 |

FOREIGN PATENT DOCUMENTS

| | | |
|---|---|---|
| DE | 47829 Y | 4/1966 |
| DE | 2143496 Y | 3/1972 |
| DE | 4321673 Y | 1/1994 |
| DE | 3306142 Y | 5/1995 |
| DE | 19525702 Y | 1/1997 |
| DE | 19637737 Y | 4/1997 |
| DE | 69613584 Y | 10/2001 |
| DE | 69710007 Y | 7/2002 |
| DE | 69524997 Y | 8/2002 |
| DE | 10161820 Y | 9/2002 |
| DE | 10137785 Y | 2/2003 |
| DE | 69718313 Y | 7/2003 |
| DE | 10204252 Y | 8/2003 |
| DE | 102004008143 Y | 10/2004 |
| DE | 102004038572 Y | 3/2005 |
| EP | 0 491 521 A | 6/1992 |
| JP | 11247861 Y | 9/1999 |
| JP | 2004011793 Y | 1/2004 |
| WO | 97/47415 A | 12/1997 |
| WO | 97/47780 A | 12/1997 |
| WO | 99/51790 | 10/1999 |
| WO | 99/51791 | 10/1999 |
| WO | 99/67075 A | 12/1999 |
| WO | 01/96049 A | 12/2001 |

* cited by examiner

*Primary Examiner* — David Bryant
*Assistant Examiner* — Ryan J Walters
(74) *Attorney, Agent, or Firm* — Lucas & Mercanti, LLP

(57) ABSTRACT

A method for producing a rolling bearing component with a carbon gradient, at least in the region of its outer layer, wherein molten metal is sprayed onto a carrier in a spraying process, the carbon content of the metal to be sprayed on being varied during the spraying operation.

11 Claims, 3 Drawing Sheets

METHOD FOR PRODUCING A ROLLING BEARING COMPONENT AND ROLLING BEARING COMPONENT

This application is a 371 of PCT/DE2007/000854 filed May 10, 2007, which in turn claims the priority of DE 10 2006 023 690.4 filed May 19, 2006, the priority of both applications is hereby claimed and both applications are incorporated by reference herein.

DESCRIPTION

1. Field of the Invention

The invention relates to a method for producing a rolling bearing component having a carbon gradient provided at least in the region of its boundary layer.

2. Background of the Invention

As is known, rolling bearings consist of at least two components, namely one or more rings between which the rolling bodies, for example rollers, run. Such rotationally symmetric rolling bearing components are conventionally produced by machining, for example from case-hardened steel, in which case rings or rollers are either turned on a lathe from a bar or forged from a pin In order to produce a defined hardness in the region of the boundary layer, a carburizing treatment is used to set up a gradient structure within which the boundary layer is enriched with carbon by a heat treatment method. Carbonitriding may also be carried out, i.e. nitrogen enrichment in the region of the boundary layer. This boundary layer becomes hard after the carburizing treatment owing to the at least 0.6% enriched carbon and the optionally also enriched nitrogen, the hardness for rolling bearing rings conventionally being 58 HRC or more. The unenriched core remains softer according to the original composition, the hardness there being between 20 and 45 HRC depending on the starting material employed. The ring being produced therefore contains for example a tough core and a hard rolling-resistant outer layer, which is also under compressive internal stresses that have a positive effect.

Owing to the loads on such a rolling bearing component, however, large carburizing depths of more than 2 mm are necessary for example in the event of high working hardnesses, which entail a heat treatment time of several hours depending on the material respectively selected. This treatment step involves considerable time expenditure, which furthermore has a detrimental effect on the production costs.

SUMMARY OF THE INVENTION

It is therefore the object of the invention to provide a method with which at least one carbon-rich boundary layer having a carbon gradient can be produced without a time-consuming carburizing treatment.

To achieve this object, in the method according to the invention it is proposed that molten metal is sprayed onto a carrier by a spraying process, the carbon content of the metal to be sprayed on being varied during the spraying operation.

In contrast to conventional rolling bearing components, the rolling bearing component according to the invention is no longer processed from a homogeneous material and subsequently subjected to a corresponding hardening treatment; rather, according to the invention the boundary layer, which conventionally forms the rolling bearing running surface, is produced by a metal spraying method. In such a spray-compacting method, a metal melt is atomized in a gas atomizer into spherical droplets in a shield gas flow. The gas rapidly cools the metal droplets to a temperature which lies between the liquidus and solidus temperatures, and often even somewhat below the solidus temperature. The drops cooled in this way move at high speed and have a paste-like consistency. When the drops now strike a surface at high speed, for example a carrier ring used to produce the component, or the like, then they are compacted owing to the high kinetic energy which they possess. A high-density material composite is formed. It is therefore possible to produce segregation-free and low-pore metal layers with a homogeneous structure and a high density by spray compacting. According to the invention, the carbon content of the sprayed metal is now varied during the spraying process in order to produce the carbon gradient, which extends radially in conventional rotationally symmetric rolling bearing components, inside the metal layer being sprayed on. This means that depending on the desired carbon gradient, the carbon content of the viscous material sprayed on is varied in the desired way during the spraying process. After the boundary layer has been sprayed on successively in coats, this also necessarily leads to a carbon content inside the completed boundary layer which varies according to the way in which the carbon content has been varied. This means that the completed rolling bearing component inherently has a carbon gradient, at least in the region of the boundary layer, which in the end can be adjusted in any desired way and therefore adapted to requirements, owing to the production according to the invention by a spray-compacting method with a varying carbon content. The very time-consuming heat treatment in the prior art for carburizing can therefore be entirely omitted. The heat treatment of the rolling bearing component, which is always to be carried out, therefore now depends only on the component dimension and therefore the weight, but no longer on the thickness of a boundary layer to be modified.

The method according to the invention thus utilizes the advantages of the spraying method which is extremely flexible in respect of the composition of the metal layer and therefore adjustment of the physical, chemical and mechanical properties of the metal layer, because the composition of the metal layer can be varied in almost any desired way particularly in respect of the individual constituents which determine the mechanical, physical and chemical properties. This means that the starting materials actually used, and therefore also the molten metal, can be selected according to the required properties. Furthermore, the inventive variation of the carbon content takes place within the testing process, so that a further degree of freedom is provided for the method according to the invention.

There are a variety of possible procedures for varying the carbon content during the spraying process. According to a first alternative of the invention, in order to vary the carbon content, carbon is introduced into the melt from which the sprayed metal is taken. This may be done for example in the form of a carbon wire, which is spooled into the melt, or by means of a carbon powder blown into the melt. Thus, the melt itself is enriched with carbon in this configuration of the invention, in which case the carbon content can be varied in any desired way by correspondingly modifying the amount of carbon wire spooled in or the amount of carbon powder blown in. The increasing enrichment of the metal to be sprayed, i.e. the molten steel, necessarily leads, as the spraying process continues, to the growth of a layer which has a different carbon content than the underlying layer, and which is enriched in carbon content to such an extent that the desired carbon content, as it is to be present after carburization, is reached.

As an alternative to introducing carbon into the melt, i.e. the melt stock per se, it is possible to blow a carbon powder into the spray cone of molten material in order to vary the carbon content. The highly fine carbon powder blown in is entrained by the metal droplets carried at high speed in the inert gas flow, and by the gas flow itself, and is thereby incorporated into the boundary layer. Here again the carbon content of the sprayed metal is correspondingly varied by the addition of carbon powder to the spray cone, whereas the variation of the carbon content can be carried out extremely rapidly here since the amount of carbon powder blown in can in the end be varied arbitrarily and at any time, the change having a direct effect on the carbon content of the layer sprayed on.

A further method alternative provides for the use of two or more melts with different carbon contents, which are mixed together to form the melt from which the sprayed metal is taken. The two melts, which can be taken from separate melt containers, are delivered to a distributor which may be an integral constituent of the spraying unit, when they are mixed in any desired mixing ratio between 100% of the first melt and 100% of the second melt. Here again, any desired carbon content can thus be achieved by mixing techniques between the minimal carbon content of one melt and the maximal carbon content of the other melt.

According to another alternative method according to the invention, two or more melts with different carbon contents are sprayed by using two or more separate spraying devices, the spray cones overlapping and the output quantities of the spraying devices being varied. Here, for example, a steel with a low carbon content is sprayed on using a first spraying device and a steel with a high carbon content is sprayed on using a second spraying device. The spray cones preferably overlap fully, i.e. they fully merge with one another when sprayed simultaneously. The melts sprayed on can consequently also be mixed together in any desired way. If only the first spraying device is operated, then only the metal sprayable using this is applied. If the second spraying system is now turned on increasingly, then the carbon content of the boundary layer finally produced, which consists of a mixture between the two starting melts, increases according to its spraying power, in which case the spraying control may be such that the first spraying device is reduced in its spraying power in proportion to how much the second spraying device is turned on. Clearly, the carbon content can be varied in any desired way between the minimal carbon content of the first melt and the maximal carbon content of the second melt. Any desired carbon gradients over the layer sprayed on, which need not necessarily be the boundary layer, as will be explained in more detail below, can also be produced by means of this.

Nitrogen or a gas enriched with nitrogen is preferably used as a carrier gas for spraying the molten metal. Nitrogen enrichment of the metal layer sprayed on may simultaneously be achieved by means of this, which corresponds to carbonitriding, so that a separate treatment step after the spray-compacting method is likewise no longer necessary for this.

According to an expedient refinement of the invention, in particular to form a wear-resistant boundary layer on the component, one or more hard substances in powder form are blown into the spray cone and these are then incorporated into the metal layer sprayed on. The hard substances may be carbides, nitrides or oxides which are fed into the spray cone in powder form and should have a very fine grain size of from 1 nm to 200 µm. By means of this, the wear can also be reduced besides the hardness increase by the carbon content.

According to a first configuration of the invention, the fluid molten metal may be sprayed onto a carrier in the form of a prefabricated part, particularly in the form of a tube or a bar of a hardenable material, which part subsequently becomes an integral constituent of the rolling bearing component being produced. Here a prefabricated carrier is thus used, which has optionally been subjected to initial shaping. As described, a bar or a tube of a appropriately hardenable material may be used as such a carrier, although this prefabricated part may likewise already have the essential contour of the rolling bearing component finally produced, for example an inner or outer ring, or it may be dimensioned accordingly. In such a case, the prefabricated part close to final contour will be applied on a reusable carrier which holds it during the spraying process and from which it can be removed.

As an alternative to using a prefabricated carrier part, it is furthermore possible to use a reusable carrier from the outset, onto which the metal is sprayed by the spraying method to form the entire component. Thus, not just a boundary layer is produced by the spray-compacting method in this configuration of the invention, rather the entire component itself, for example the inner or outer ring. To this end a reusable carrier is used, for example a ceramic or concrete tube, onto which, in order to form the essential component body, a melt of a composition that this central component body is intended to have, is sprayed. As described in the introduction, a case-hardened steel is conventionally used for this. The carbon variation according to the invention is then carried out in order to form the boundary layer. This procedure is adopted when the rolling bearing component is an inner ring, the rolling bearing running surface of which is the outer side. If the rolling bearing component is an outer ring, then the carbon variation according to the invention begins immediately with the first spraying onto the reusable carrier, and the material for forming the essential component body is not sprayed on until after this inner boundary layer has been produced. If an enriched outer boundary layer is additionally intended to be produced, carbon addition according to the invention is again carried out during the final spraying process at the end of the spraying process.

As is apparent, there is thus a very high degree of flexibility in the method according to the invention which makes it possible to produce a very wide variety of rolling bearing components in respect of their composition and their properties, time-consuming heat treatment methods for carburizing or carbonitriding advantageously being omitted. After the rolling bearing component has been manufactured in the scope of the method according to the invention, it is then merely necessary to redensify the residual porosity in the subsequent manufacturing steps such as forging and/or ring rolling, followed by a conventional heat treatment without time-intensive diffusion-controlled formation of the rolling bearing running layer. When using preformed blanks, preferably close to final contour (prefabricated carriers), these finishing steps may also be simplified.

Besides the method according to the invention, the invention relates to a rolling bearing component, particularly in the form of a ring or a roller, comprising at least one boundary layer which is formed by spraying on a molten metal and inside which the carbon content varies at least in sections. The rolling bearing component is produced in particular by the method described in the introduction. The rolling bearing component itself may comprise a prefabricated metallic carrier, in particular a ring close to final contour, or the like, on which the boundary layer is formed. As an alternative, the rolling bearing component as a whole may be a spray-compacted component fully produced by a spraying method. Furthermore, one or more hard substances may be incorporated at least in sections in the boundary layer being sprayed on, which may likewise contain an increased nitrogen content introduced during the spraying method.

BRIEF DESCRIPTION OF THE DRAWINGS

Further advantages, features and details of the invention will be described below with the aid of exemplary embodiments with reference to the figures. The figures are schematic representations, in which.

DETAILED DESCRIPTION OF THE DRAWINGS

Figure 1:
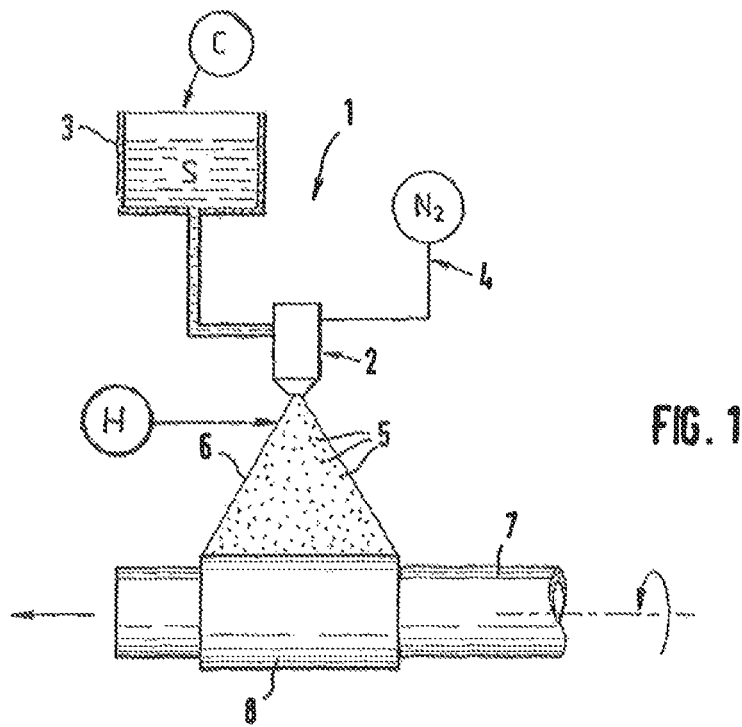
FIG. 1 shows an outline representation to explain a first method variant.

FIG. 1 shows, in the form of an outline representation, a spraying device 1 by means of which the method according to the invention can be carried out. The spraying device 1 comprises on the one hand the spraying unit 2, as well as a melt stock container 3 which contains a metal melt S. A carrier gas supply 4 is furthermore provided, here a nitrogen feed. Molten metal to be sprayed is taken continuously from the melt stock container 3, and is sprayed in the form of very small metal droplets 5 via the carrier gas in a spray cone 6 onto a carrier 7, in the example shown, a tube of a hardenable material. The carrier 7 rotates and can be moved axially. With increasing rotation and spraying time, an ever-thicker spray-compacted layer is formed on the carrier 7. In order to be able to vary the carbon content inside the sprayed layer 8, in the example shown, carbon C is introduced into the melt S at the appropriate time. This may be done by spooling in a carbon wire or by blowing in carbon powder. The melt is consequently enriched with carbon, and, therefore necessarily, so is the layer 8 being produced. While it is indicated in the example shown according to FIG. 1 that the carbon C is introduced directly into the melt stock container 3, it is of course possible to introduce it in the melt feed not until immediately before the spraying unit 2 or into the latter itself. In any event, in this exemplary embodiment the carbon C is introduced into the homogeneous melt.

In a specific method configuration, for example, the process of spraying onto the carrier 7, here as described a tube, for example of a case-hardened steel which is thus hardenable, is initially started by using the original melt S, i.e. without a composition varied in carbon content. The melt S comprises for example the composition of a case-hardened steel, i.e. the carbon content is less than 0.35%, and optionally contains alloy elements such as Cr (maximum 4%), Mo (maximum 2%), Ni and/or Mn (maximum 4% each) and Si (maximum 1.5) as well as other steel constituents. By using this original composition, a first layer 8a (see FIG. 2) which has a thickness of several millimeters, preferably at least 5 mm, is initially sprayed on during the spraying process. The carbon-enriched boundary layer is then formed by the spraying process, to which end the carbon C is introduced into the melt S in order to increase the carbon content of the melt as described. As a result of this, the subsequently produced second boundary layer 8b is enriched even more with carbon as represented in the outline diagram in FIG. 2. There, the carbon content is plotted over the cross section of the two layers 8a, 8b, and here again it should be pointed out that this is only an outline representation. The maximum carbon content present in the boundary layer 8b corresponds to the desired carbon content as is likewise conventionally encountered after a carburizing step, which is not required here.

Figure 2:
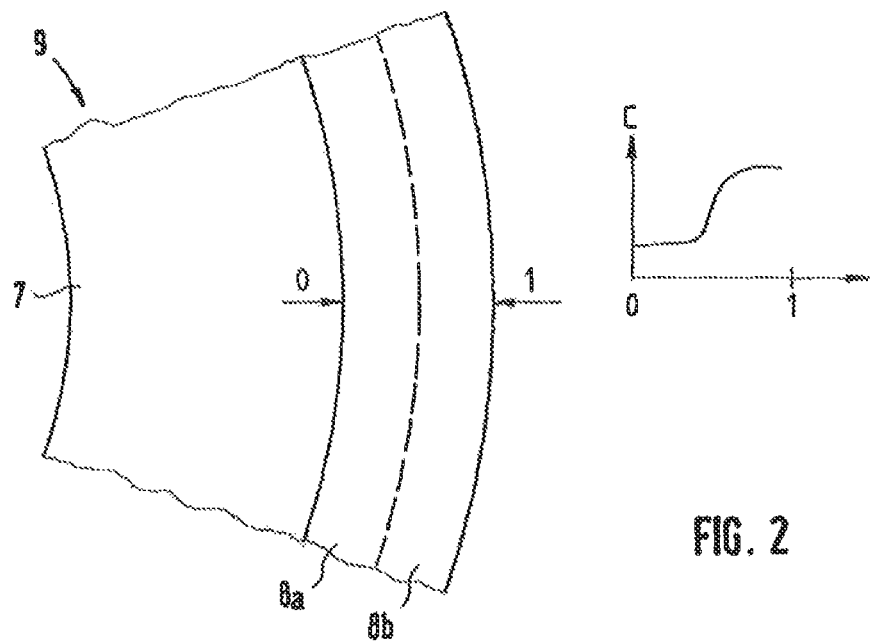
FIG. 2 shows a partial view of a rolling bearing component according to the invention with a representation of the carbon gradient.

Here, the carrier 7 forms an integral constituent of the rolling bearing component being produced. In the example shown, individual rings are cut to length from the carrier 7 in order to form the rolling bearing component, FIG. 2 showing a partial sectional view of such a rolling bearing component 9 cut to length, here in the form of a ring. Instead of a continuous tube, it would of course also be possible to use individual prefabricated parts close to final contour, here rings, in which case however they are arranged in series on a reusable carrier (not shown in detail here) and can be taken from it.

According to an embodiment of the invention, one or more hard substances H in powder form are blown into the spray cone as shown schematically in FIG. 1. These hard substances are then incorporated into the metal layer that is sprayed on, in particular to form a wear-resistant boundary layer on the component.

Figure 3:
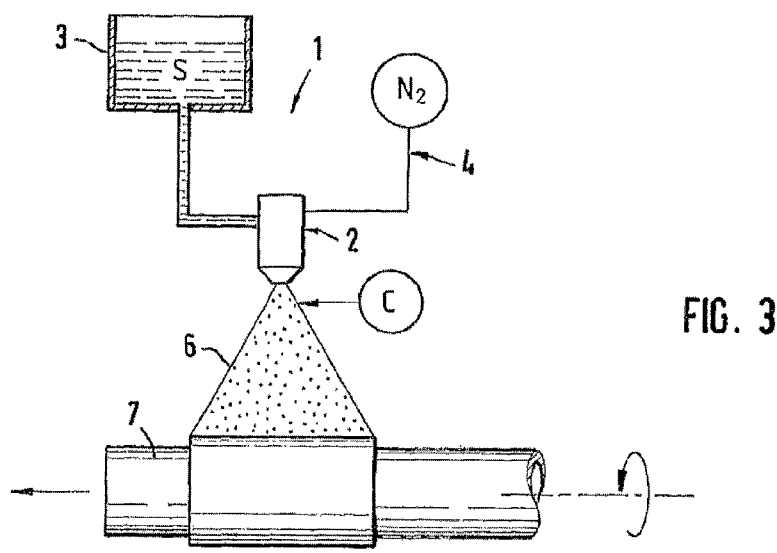
FIG. 3 shows an outline representation to explain a second method variant.

FIG. 3 shows another variant for production of the layer comprising a carbon gradient. In the spraying device 1 shown here, comprising a spraying unit 2 and a melt stock container 3 with the melt S of the original composition and a carrier gas feed 4, the carbon C is added at the required time directly into the melt cone 6 where the carbon powder being blown in is immediately entrained by the metal droplets emerging at high speed from the spraying unit 2 and the carrier gas ($N_2$) and is incorporated into the boundary layer being formed (according to the exemplary embodiment of FIG. 2, the boundary layer 8b). Here again, it is possible initially to form a layer by using the unmodified melt composition and to carry out the carbon enrichment not until a later time. In this configuration of the invention, an extremely rapid variation of the carbon content is possible owing to the direct introduction into the spray cone 6. Wear-reducing hard substances in the form of extremely fine powdered oxides, carbides or nitrides, which become incorporated into the layer 8b, could additionally be introduced into the spray cone.

Figure 4:
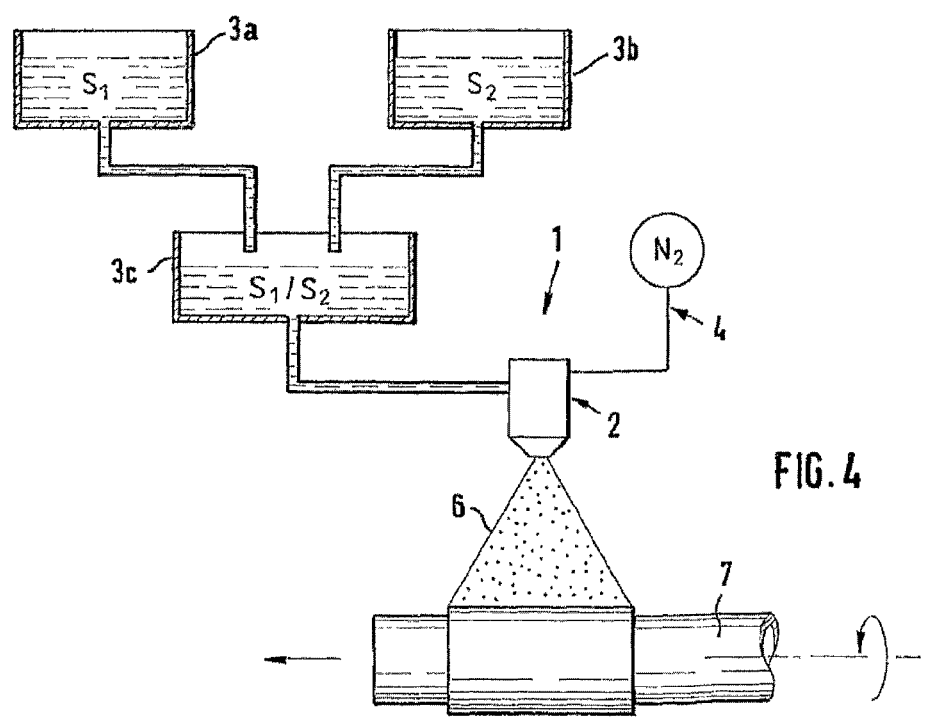
FIG. 4 shows an outline representation to explain a third method variant.

FIG. 4 shows a further outline representation to explain another method variant. The spraying device 1 shown here likewise comprises a spraying unit 2 as well as in total three melt stock containers 3a, 3b and 3c. In the example shown, there is a first melt $S_1$ with a low carbon content in the melt stock container 3a, and the melt stock container 3b contains a melt $S_2$ with a high carbon content. These melts are now poured alternately or simultaneously into the third melt stock container 3c, which then contains either the pure melt $S_1$, the pure melt $S_2$ or a mixed melt of the melts $S_1$ and $S_2$. From this melt stock container 3c, which need not be a large container, but instead may in this case be a small-dimensioned distributor, the final melt composition to be sprayed is now taken and sprayed via the melt cone 6 with the aid of the inert gas supplied through the carrier gas feed 4.

The carrier 7 in FIG. 4 is for example—other than described above—a reusable carrier, for example a ceramic or concrete tube. The entire rolling bearing component, i.e. in this case the ring, is applied onto it by the spray-compacting method. To this end, for example, an inner boundary layer is sprayed on in a first spraying stage exclusively by using the melt $S_2$ having the high carbon content, until the desired layer thickness is reached. The melt $S_1$ is then added increasingly until the pure melt $S_1$ is sprayed in order to form the essential component body. In order to form an outer-lying carbon-enriched boundary layer, the proportion of melt $S_2$ is now again increased up to at most 100% in the last spraying stage, so that the carbon gradient is also formed there. Here, the entire rolling bearing component is thus produced by the spray-compacting method, the inner and outer boundary layers having the carbon gradient in the example described. In this case, it is of course possible to configure only the inner or outer boundary layer accordingly.

Figure 5:
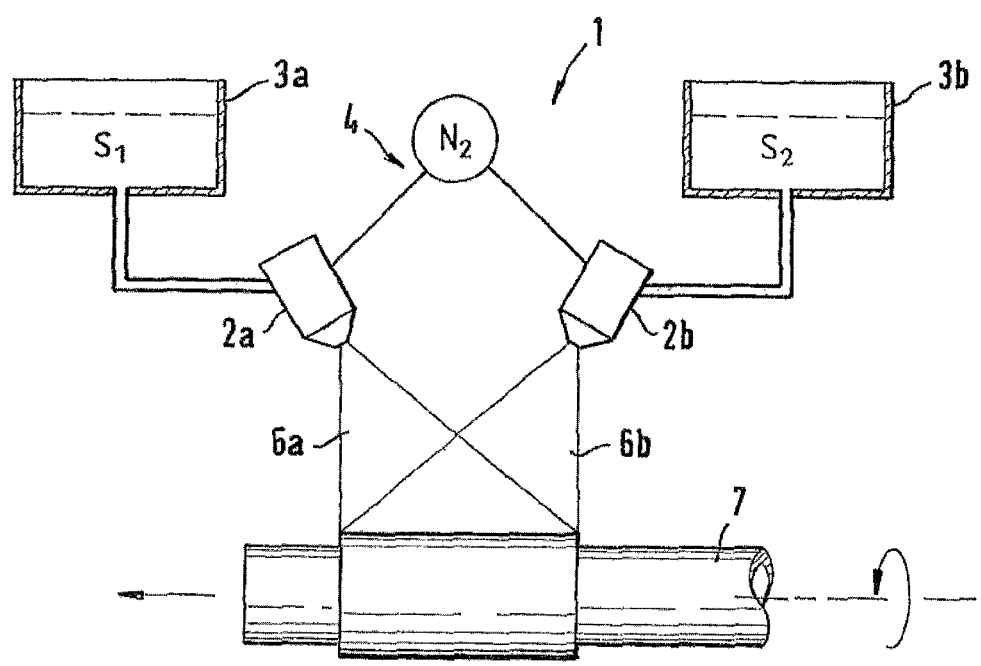
FIG. 5 shows an outline representation to explain a fourth method variant.

FIG. 5 finally shows another outline representation of a spraying device 1 for carrying out the method according to the invention. It comprises two separately operable spraying devices 2a, 2b, to which separate melt stock containers 3a, 3b are respectively allocated. The melt stock container 3a contains a melt $S_1$ having a low carbon content, and the melt stock container 3b contains a melt $S_2$ having a high carbon content. The two spraying devices 2a, 2b, which in the examples shown are supplied through a common carrier gas supply 4 here, are arranged so that their respective spray cones 6a, 6b overlap, in the example shown, fully in the vicinity of the carrier 7. Here again, it should be assumed that the carrier 7 is a reusable carrier in the form of a ceramic tube or the like. If, for example, a ring is to be produced with an inner and an outer boundary layer having a carbon gradient, then the spraying unit 2b begins first by spraying the first layer consisting of the melt $S_2$ having the high carbon content. After a minimum layer thickness of a few millimeters is reached, the spraying power of the spraying unit 2b is reduced continuously and the spraying device 2a is turned on and its spraying power is increased continuously. The reduction and increase of the respective capacity preferably occurs synchronously, so as to provide a total spraying power of 100% at any time. In order to form the essential component body, spraying is carried out with 100% melt $S_1$, i.e. the rolling body consists only of material from the melt $S_1$. In order to form the outer boundary layer, the process is then reversed again i.e. the spraying power of the spraying unit 2a is lowered continuously while that of the spraying unit 2b is increased continuously. A ring or a tube is obtained with a hardenable bore, a less hardenable core and an again more hardenable outer boundary layer.

Overall, the method according to the invention allows the simple production of a carbon gradient structure in the region of inner or outer boundary layers. A special carburizing step, which takes a very long time, is no longer necessary. This proportion of the production costs is likewise avoided, as is the delay factor due to this heat treatment step, so that the finishing (grinding) becomes less expensive. In the case of a ring roller, it furthermore omits excavation of the inner forging burr to be carried out at the start, which amounts to about 25% of the ring weight. Finally, the production sequence is shortened significantly in time overall, since the otherwise standard route via bar/semifinished product production in the steelworks, sawing the pins for forging and the carburizing process are omitted.

List of References

1 Spraying device
2 Spraying unit
2a Spraying unit
2b Spraying unit
3 Melt stock container
3a Melt stock container
3b Melt stock container
3c Melt stock container
4 Carrier gas supply
5 Metal droplet
6 Spray cone
6a Spray cone
6b Spray cone
7 Carrier
8 Layer
8a Layer
8b Layer
9 Rolling bearing component
S Metal melt
$S_1$ Melt
$S_2$ Melt
C Carbon
$N_2$ Carrier gas

The invention claimed is:

1. A method for producing a rolling bearing component having a carbon gradient provided at least in the region of its boundary layer, comprising;
   spraying a molten metal onto a carrier by a spray-compacting method, the step of spraying comprising receiving, by a spraying unit, the molten metal from a melt, atomizing the molten metal into droplets in a shield gas flow such that the gas flow cools the metal droplets to a temperature that is one of:
      below a solidus temperature; and
      between the liquidus and solidus temperatures; and
   varying the carbon content of the metal to be sprayed on during the spraying operation.

2. The method as claimed in claim 1, wherein in order to vary the carbon content, carbon is introduced into a melt from which the sprayed metal is taken.

3. The method as claimed in claim 2, wherein the carbon is spooled into the melt in the form of a wire or blown into the melt as a powder.

4. The method as claimed in claim 1, wherein in order to vary the carbon content, carbon powder is blown into the spray cone of molten metal.

5. The method as claimed in claim 1, wherein two or more melts with different carbon contents are used, which are mixed together to form the melt from which the sprayed metal is taken.

6. The method as claimed in claim 1, wherein two or more melts with different carbon contents are sprayed by using two or more separate spraying devices, the spray cones overlapping and the output quantities of the spraying devices being varied.

7. The method as claimed in claim 1, wherein nitrogen or a gas enriched with nitrogen is used as the shield gas for the spraying.

8. The method as claimed in claim 1, wherein, to form a wear-resistant boundary layer on the component, one or more hard substances in powder form are blown into a spray cone of the molten metal spray.

9. The method as claimed in claim 8, wherein powders with a grain size of from 1 nm to 200 µm are used.

10. The method as claimed in claim 1, wherein a prefabricated part is used as the carrier, which part is an integral constituent of the rolling bearing component being produced.

11. The method as claimed in claim 1, wherein the carrier is a reusable carrier, onto which the metal is sprayed by the spraying method to form the entire component.

* * * * *